Feb. 19, 1929.
C. L'ENFANT
1,702,263
PICTURE FRAME
Filed Feb. 19, 1925   2 Sheets-Sheet 1
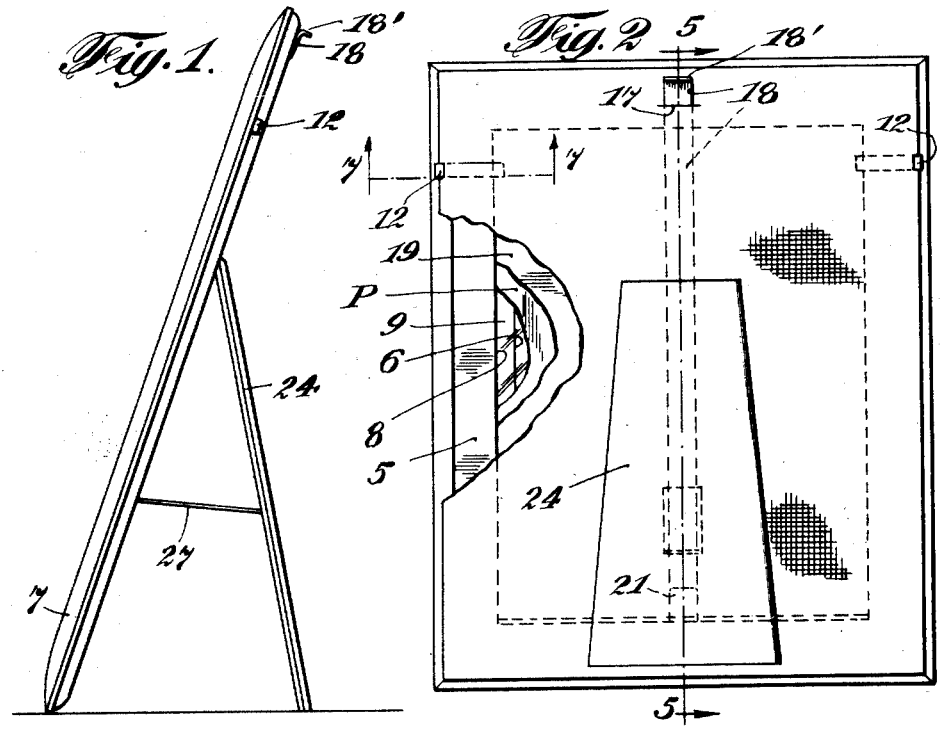
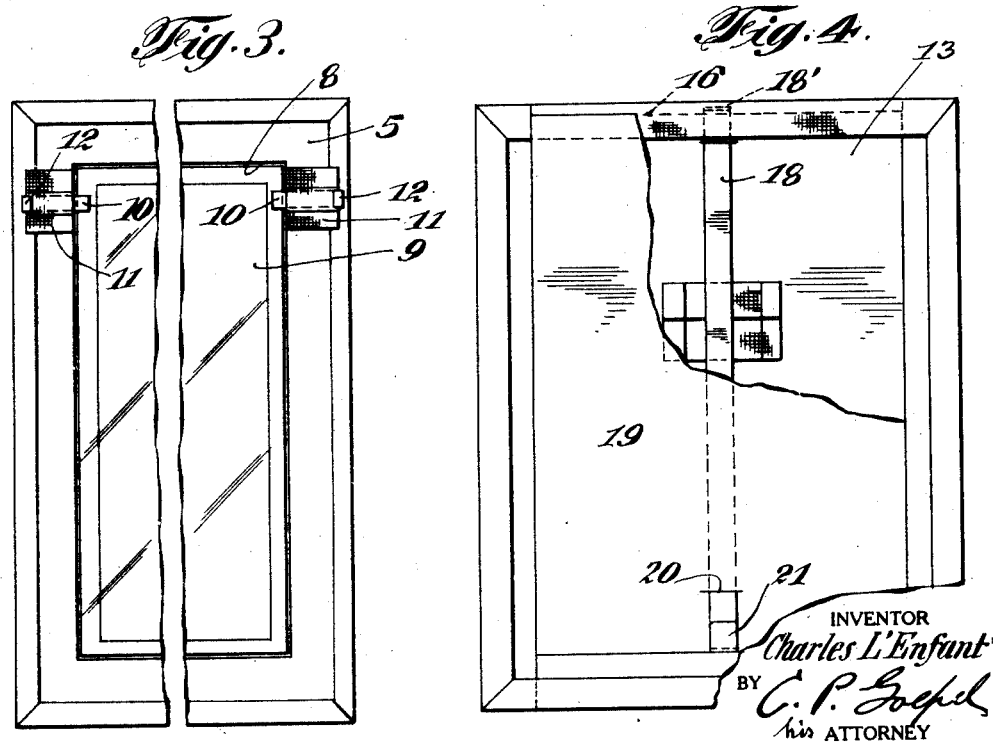
INVENTOR
Charles L'Enfant
BY
his ATTORNEY Feb. 19, 1929.
C. L'ENFANT
PICTURE FRAME
Filed Feb. 19, 1925   2 Sheets-Sheet 2
1,702,263
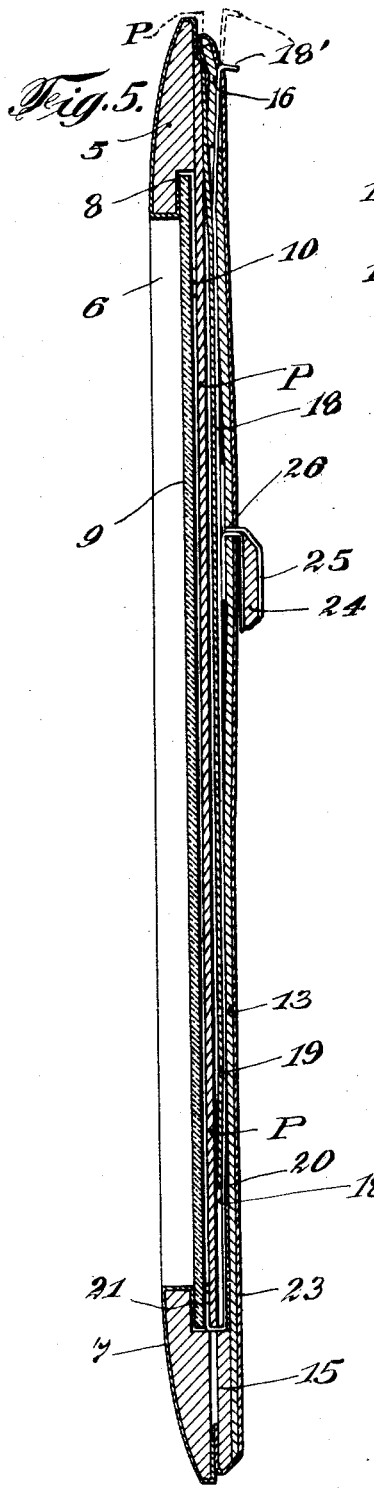
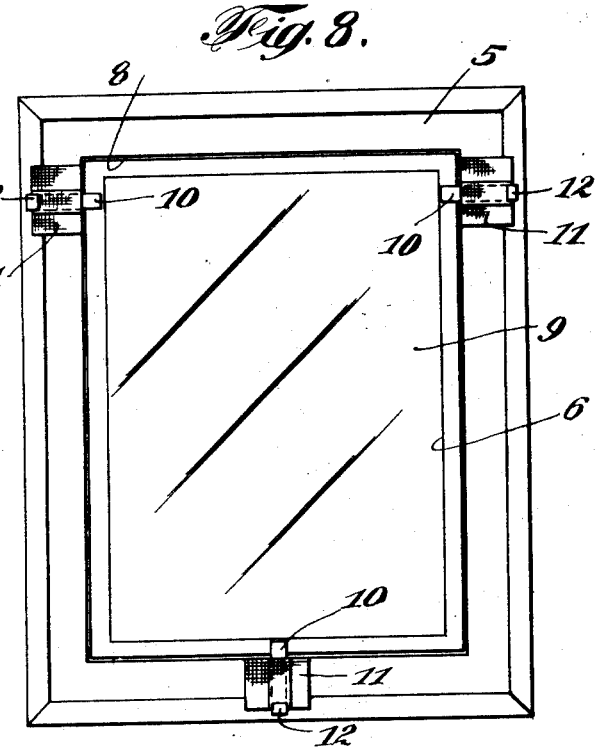
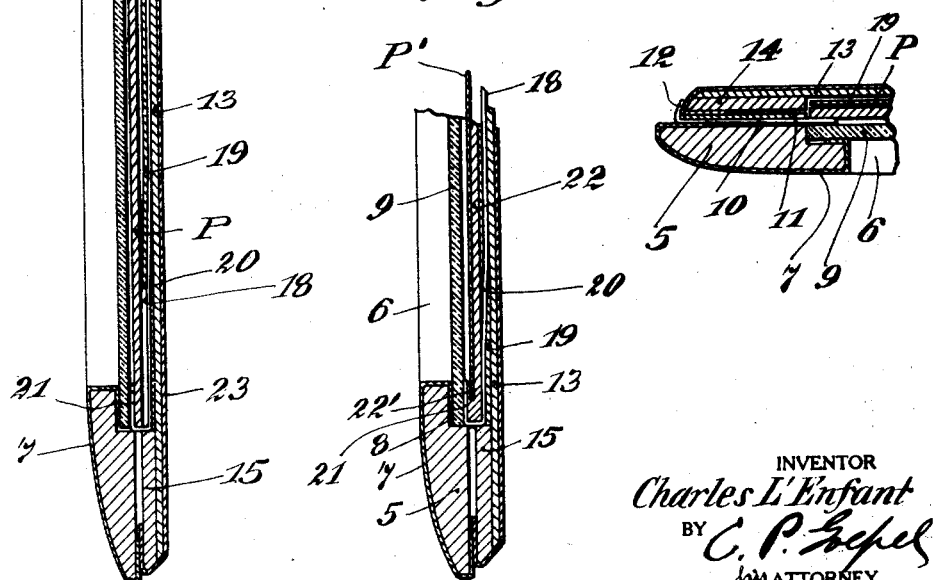
INVENTOR
Charles L'Enfant
BY
ATTORNEY Patented Feb. 19, 1929.

1,702,263

UNITED STATES PATENT OFFICE.

CHARLES L'ENFANT, OF NEW YORK, N. Y., ASSIGNOR OF ONE-HALF TO MURRAY ECKER, OF NEW YORK, N. Y.

PICTURE FRAME.

Application filed February 19, 1925. Serial No. 10,192.

This invention relates to picture frames, and more particularly to frames of that type commonly sold by art stores for the purpose of holding and displaying photographs or other pictures of a more or less personal nature. Heretofore, frames of this character have invariably consisted of a body part of wood composed of one or more sections and having inner rabbeted edges to receive the glass plate and the picture. At the rear side of this frame body at the top of the opening, a back member is hinged, said member being usually carried by a surrounding cloth covered cardboard strip which is glued or otherwise fixedly secured to the rear side of the frame body. This hinged back which fits into the rabbeted edges of the frame carries a suitable prop or easel and is retained in the frame opening by a number of clasps pivoted on the back of the frame body. In view of the fact that the front surfaces of the frame body are frequently covered by silk, velvet, tooled leather or other ornamental materials which are quite expensive and that the hinged back and the surrounding part secured to the frame body are also covered with similar materials, it is apparent that in the production of such frames, there is a considerable waste of the material. Further, the hinged back usually becomes badly warped after a short period of use so that dirt and dust collects within the frame and upon the parts of the picture. Again, in order to remove either the picture or the glass, should the latter become broken, it is necessary to release the clasps holding the back and then remove the several fasteners securing the glass within the frame.

It is the primary object and purpose of my present improvements to provide a picture frame of the above type wherein the several objections just noted are entirely obviated, my improved construction being primarily characterized by the fact that there is practically no waste whatever of the comparatively expensive covering materials for the parts of the frame.

One of the principal purposes of my present invention is to eliminate the usual hinged back and to provide means whereby both the glass and the picture can be easily and quickly inserted or removed from one edge of the frame.

In one embodiment of my invention, I provide a closed back which may consist of a sheet of cardboard of suitable thickness reinforced along its opposite sides and one of its end edges on the face of said back which is adapted to be applied against the rear side of the frame body and glued or otherwise fixed thereto. In conjunction with this back for the picture frame, I provide manually operable means whereby the picture may be moved longitudinally between the reinforced side edges of the frame and withdrawn at one end of the frame from between the body part thereof and said back and a new picture inserted in its place. It is also one of the important features of my improvements to provide means at the latter edge of the back of the picture which will tend to close the edge opening through which the picture may be inserted or withdrawn to prevent the entrance of dust and dirt therethrough.

Another novel feature of my present improvements resides in the provision of means operable from the exterior of the frame for holding the glass in the rabbeted inner edges of the frame body and which may be easily actuated to also permit of the withdrawal of the glass through said end opening between the frame body and the back and the substitution of a new glass therefor.

With the above and other objects in view, the invention consists in the improved picture frame and in the form, construction and relative arrangement of its several parts as will be hereinafter more fully described, illustrated in the accompanying drawings, and subsequently incorporated in the subjoined claims.

In the drawings, wherein I have illustrated one simple and practical embodiment of the invention and in which similar reference characters designate corresponding parts throughout the several views,—

Figure 1 is an edge view of a picture frame of the easel type embodying my present improvements;

Fig. 2 is a rear elevation thereof, certain of the parts being broken away;

Fig. 3 is a rear elevation of the frame body, the back being removed and showing the means for holding the glass in place;

Fig. 4 is a detail elevation of the back for the picture frame illustrating the picture removing means associated therewith;

Fig. 5 is an enlarged central longitudinal section taken on the line 5—5 of Fig. 2;

Fig. 6 is a fragmentary view showing the means which I provide for the purpose of mounting or arranging a relatively thin picture in the frame;

Fig. 7 is a detail horizontal section taken on the line 7—7 of Fig. 2, and

Fig. 8 is a view similar to Fig. 3, showing an additional means for holding the glass which is employed in certain cases.

In a preferred embodiment of my present improvements, the body section of the frame indicated at 5 may be of any desired cross sectional configuration, and constructed of sheet metal, wood, or other suitable materials. This frame may either be produced in a single piece, or may be made up of separate strips suitably mitered and joined at their abutting ends. It will of course, also be understood that in so far as the novel features of my present disclosure are concerned, the outline form or shape of this frame body is not material. In any case, said frame body is provided with the usual opening therein shown at 6 of a predetermined form or shape through which the photograph or picture is viewed. The front surfaces of said frame body are covered by silk, velvet, plush, leather or other decorative material indicated at 7, said material at its opposite edges being turned inwardly around the edges of the opening 6 and rearwardly upon the rear side of the frame body, respectively. This frame body at the rear side thereof and at the edges of the opening 6 is rabbeted or recessed as at 8. It will of course, be understood that the decorative material 7 is smoothly and securely held upon the surface of said frame body by glue or other suitable adhesive.

The rabbets or recesses 8 are adapted to receive the marginal edges of a plate of glass or other transparent material 9, and for the purpose of retaining said glass in position within said recesses against shifting movement relative to the frame body, I provide a plurality of thin metal slides 10 mounted upon the rear side of said frame body and slidably retained in position thereon by the strips of fabric 11 which extend over said slides and are glued at their opposite ends to the rear side of the frame. These slides extend at right angles to the edges of the openings 6 and at their outer ends are provided with suitable finger pieces 12 whereby they may be conveniently manipulated. As shown in Fig. 3 of the drawings in most cases, I provide only two of these slides which are arranged adjacent the upper end of the frame opening 6.

For the frame structure above described, I provide a separate back, which as herein shown consists of a relatively heavy sheet of material 13, preferably cardboard which has secured upon one side thereof at its opposite longitudinal edges reinforcing strips 14, a similar reinforcing strip 15 also being secured to the cardboard sheet 13 at the lower end thereof and extending between the side strips 14.

At its upper edge and between the reinforcing strips 14 the cardboard sheet 13 is horizontally scored as at 16 to provide a resiliently yieldable flange thereon, the purpose of which will hereinafter become apparent.

Adjacent to the upper end of the sheet 13 and centrally thereof said sheet is provided with a narrow horizontally extending slit 17 therein and through this slit a narrow metal strip 18 is freely movable. The upper end of said strip when the latter is in its normal position, projects through the slit 17 upon the rear side of the sheet 13 but does not project above the upper edge of said sheet. Thus it will be understood that this strip 18 extends longitudinally and centrally over the inner face of the sheet 13. At its other end said metal strip extends through a slit 20 adjacent the lower end of a paper sheet 19 which is of such width as to fit between the longitudinal reinforcing strips 14 on the back sheet 13. This lower end of the metal strip which extends upon the front side of said paper sheet 19 terminates in a U-shaped bend or hook 21 which is adapted to press against the rear side of the glass 9 at its lower end and thereby supplement the slide members 10 at the upper end of the frame in holding the glass within the frame recesses 8. However, the primary purpose of this hook 11 is to receive the lower end of the picture or the lower edge of a holder for the picture as will presently be explained. In Fig. 1 of the drawings, I have shown a picture P such as a photograph, and as is well known photographs are usually mounted upon a relatively heavy cardboard base. In mounting such a picture in the frame, owing to the rigidity of the picture itself it is not necessary to provide an additional holding means therefor. In some cases however, the picture may consist of a relatively thin sheet as shown at P' in Fig. 6, and in such instances, I provide an adapter or holder 22 for the purpose of receiving the thin picture sheet and preventing the same from buckling when it is inserted into the frame in a manner to be later referred to.

The rear side of the back sheet 13 is also entirely covered by decorative material as shown at 23, which may either correspond with the material covering the surfaces of the frame body 5, or be different therefrom and of other design. The marginal edges of this decorative material are turned inwardly over the front side of the sheet 13 and glued or adhesively secured thereto. Owing to the fact that the back 13 is not provided with the usual opening therein for the insertion and removal of the picture and which heretofore has occasioned considerable waste of the covering material 23, it will be apparent that such waste will be obviated, and considerable economy thereby realized in the application of such covering material, which frequently is quite expensive.

The back 13 is provided with a suitable easel or prop which as herein shown consists of a suitably shaped piece or strip 24 of cardboard or other material, the surfaces of which are also covered by the decorative material similar to that applied to the back 13. At the upper end of the prop 24, the covering material 25 thereon is extended to provide parts 26 adapted to be passed through slits formed in the back 13 and the covering sheet thereon, said parts 26 being adhesively secured upon the front side of said back. A flexible strap 27 may connect the prop 24 intermediate of its ends with the back 13. However, it will be understood that in so far as the novel features of my present improvements are concerned, they may be advantageously applied to other picture frames than those of the easel type.

It is understood of course, that the covering material 23 on the back 13 is likewise provided with a slit coinciding with the slit 17 through which the metal strip 18 projects.

This strip at its upper end may be provided with a suitably formed finger piece 18′.

After the covering material has been applied upon the back 13 and the metal strip 18 and paper sheet 19 assembled therewith, this back is applied against the rear side of the frame body 5, glue or other adhesive being first applied upon the reinforcing strips 14 and 15 carried by said back. Thus along its opposite side edges and its bottom edge said back is tightly and permanently secured to the rear side of the frame body. Owing to the provision of the reinforcing strips 14, it will be obvious that at its upper end said back 13 between the reinforcing strips is unattached to the rear side of the frame body. However, normally the space which would otherwise result will be substantially closed by the resiliently movable upper edge portion of the back sheet 13 produced by the score line 16 so that dust and dirt may not find entrance through said space between the frame body 5 and the permanently fixed back thereof.

In the use of my invention as above described, assuming that a relatively heavy picture such as a mounted photograph is to be displayed in the frame, the lower end of the picture is inserted between the upper free edge portion of the back 13 and the rear side of the frame body 5, the metal strip 18 having first been pulled upwardly to the limit of its movement, or until the hooked lower end 21 thereof engages the upper edge of the slit 20. The picture is forced downwardly between the paper sheet 19 and the glass 9 until its lower edge is received in the hook 21 on the metal strip, whereupon in the continued downward movement of the picture, the metal strip 18 is also forced downwardly to its former position and until said hook engages the lower reinforcing strip 15 on the back 13, the upper edge of which is substantially in the same plane as the outer edge of the lower recess 8 in the frame body 5. The hook 21 is of such length that it does not project above the lower portion of the frame body 5 so that it is not visible through the glass 9. When the picture is thus finally disposed in position between the glass 9 and the back 13, its upper edge is disposed below the upper edge of the back 13, said edge portion of the back 13 springing inwardly over the upper edge of the picture to prevent the entrance of dust and dirt as above explained. To make the edge of the back 13 do this the back is made of resilient material and the apparatus thereof is bent along the score line 16 and given a permanent set so that it inclines toward the frame 5, as indicated in Figure 5; at the same time this upper edge can yield when pulled outward away from the top of the frame to permit the picture to be inserted. The upper end of the strip 18 which passes out through the slit 17 adjacent the score line 16 may assist in keeping the top edge of the back 13 in contact with the frame 5. Should it be desired at any time to change the picture and place another one in the frame, it is only necessary to engage the finger piece 18′ and pull upwardly on the strip 18 so that the hook 21 on the lower end of the strip will lift or force the picture upwardly and project the upper edge thereof above the frame 5 so that it can be easily grasped and entirely withdrawn. The new picture may then be easily and quickly inserted in its place.

Should it also become necessary or desirable to remove the glass 9, either by reason of the fact that the same is cracked or broken or requires cleaning, this may be easily accomplished by simply sliding the metal holding members 10 outwardly to disengage their inner ends from the edges of the glass. By then moving the frame towards the horizontal position, the glass will fall rearwardly against the paper sheet 19. The frame is then inverted so that the glass will drop by gravity between the rear side of the frame and the unattached end of the back 13. Thus the glass can be thoroughly washed and cleaned without soiling the decorative covering of the frame, or a new glass substituted for the cracked or broken one.

When the photograph has a very heavy mounting which would occupy substantially the entire transverse space between the back 13 and the base of the frame recess 8, the metal strip 18 and the sheet 19 would not be provided, and in such case an additional glass holding metal member 10 would be employed at the lower end of the frame as shown in Fig. 8 of the drawings.

In the insertion of a relatively thin unmounted picture or photograph in the frame, it is necessary to use the holder or adapter 22. This adapter may consist of a heavy cardboard mat provided at its upper and lower ends in the front side thereof with horizontally extending grooves such as is indicated at 22' in Fig. 6, to receive the upper and lower end edges of the thin picture P'. Thus this mat may be readily forced downwardly between the back and the glass 9 of the picture frame in the same manner as a mounted photograph, without bending or buckling of the relatively thin picture.

It will be noted that when the mounted or framed picture is viewed from the front, the outer ends of the glass holding members 10 and the upper end of the metal strip 18' are positioned inwardly of the edges of the frame so that they are entirely hidden and invisible.

From the foregoing description considered in connection with the accompanying drawings, the construction, manner of use and several advantages of my new picture frame will be clearly understood. It will be seen that I have devised a frame of this particular type which is of such construction that the several mechanical operations necessary in the production of its parts will be materially simplified, and at the same time a considerable saving in the materials used will be realized. Therefore, quantity production of such frames may be greatly expedited with an appreciable reduction in manufacturing costs. As heretofore observed, such a frame may be produced in various sizes and ornamental shapes and both the frame body and the back thereof can be provided with various different kinds of decorative covering as heretofore commonly used in connection with such devices.

I have herein disclosed an embodiment of the invention which I have found entirely practical and satisfactory, but it will nevertheless be understood that the several features thereof as heretofore described might be exemplified in various other structural forms, and I accordingly reserve the privilege of adopting all such legitimate changes in the relative arrangement, form and construction of the several parts as may be fairly incorporated within the spirit and scope of the invention as claimed.

I claim:

1. A picture frame comprising a body having an opening and a glass seated in the frame over the opening, a back of resilient material for the frame permanently secured thereto and having one of its edges unattached to the rear side of said frame for the insertion of the picture between the back and the glass, the unattached edge of the back being set to extend yieldably towards the back of the frame and make contact therewith so as to cover the adjacent edge of the picture, and means slidably mounted upon the inner face of the back to engage the picture so that the picture can be withdrawn for removal by projecting it outward past the unattached edge of the back on said frame.

2. A picture frame comprising a frame body having an opening and a glass seated in said frame body over one side of the opening, a back for said frame body permanently secured thereto and having one of its edges unattached to the rear side of said frame body for the insertion of the picture longitudinally between said back and the glass, a metal strip slidable upon the inner side of said back and extending through a slit therein at one of its ends, the other end of said strip having means thereon engaged by the picture whereby, upon pulling said strip outwardly through said slit one end of the picture is projected outwardly between the unattached edge of the back and the frame body to permit of the removal of the picture.

3. A picture frame comprising a frame body having an opening and a glass seated in said frame body over one side of the opening, a back for said frame body permanently secured thereto and having one of its edges unattached to the rear side of said frame body for the insertion of the picture longitudinally between said back and the glass, a metal strip slidable upon the inner side of said back and having one of its ends extended through a slit therein, the other end of said metal strip terminating in a hook to receive one edge of the picture, whereby, upon pulling the said strip outwardly through said slit another edge of the picture is projected outwardly between the unattached edge of the back and the frame body to permit of the removal of the picture.

4. A picture frame comprising a frame body having an opening therein and recesses at the rear side of the frame body, a glass plate engaged at its edges in said recesses, a back for the frame body having certain of its edges reinforced and permanently secured to the rear side of the frame body and another edge of said back unattached to the frame body whereby a picture may be inserted between said back and the glass, means movably mounted upon the inner side of said back and manually operable to project one end of the picture outwardly between the unattached edge of said back and the frame to permit of the removal of the picture, and said unattached edge of the back having a resiliently yieldable portion normally closing the space between the same and the frame body.

5. A picture frame comprising a frame body having an opening, the edges of the opening at the rear side of the frame body being recessed, a glass plate adapted to be seated at its edges in said recesses, releasable holding devices for the glass mounted upon the rear side of the frame body, a back for said frame body having certain of its edges reinforced and permanently secured to the rear side of the frame body and having another edge of said back unattached to the frame body to afford a space between said edge of the back and the rear face of the frame, said glass plate when released adapted to be moved into alignment with said space and withdrawn therethrough, said space also permitting of the insertion or removal of a picture between said back and the glass, and means carried by said back and engageable by the picture manually operable to project one edge of the picture outwardly through said space whereby the picture may be removed.

6. A picture frame comprising a frame body having an opening, the edges of the opening at the rear side of the frame body being recessed, a glass plate adapted to seat at its edges in said recesses, releasable holding devices for the glass mounted upon the rear side of the frame body, a back for said frame body having certain of its edges reinforced and permanently secured to the rear side of the frame body and having another edge of said back unattached to the frame body to afford a space between said edge of the back and the rear face of the frame, said glass plate when released adapted to be moved into alignment with said space and withdrawn therethrough, said space also permitting of the insertion or removal of a picture between said back and the glass, a slidable metal strip mounted upon the inner side of said back and projecting outwardly therethrough at one of its ends, said strip terminating in a hook at its other end bearing against one end of the glass to retain the same in the recesses of said frame and said hook adapted to receive one edge of the picture, whereby upon pulling said strip in one direction, the opposite edge of the picture is projected outwardly between the unattached edge of said back and the frame to permit of the removal of the picture.

7. A picture frame comprising a frame body having an opening and a recess surrounding said opening at the back thereof, a back of resilient material secured to the frame body in spaced relation thereto forming a pocket, the open edge of which is yieldingly engaged against the back of the frame body, and a transparent plate seated in the recess and adapted to be removed from the frame by movement through the space between the frame body and back in a plane parallel with the front and back faces of the frame.

8. A picture frame comprising a frame body having an opening and a recess surrounding said opening at the back thereof, a back secured to the frame body in spaced relation thereto and with one of its edges unattached, a transparent plate seated in the recess and adapted to be removed from the frame by movement through the space between the frame body and back in a plane parallel with the front and back faces of the frame, the space between the back and frame being adapted to contain a picture viewable through the transparent plate, and means slidably mounted on the back and engageable with the innermost edge of the picture for projecting the outermost edge of said picture outwardly through the space between the frame body and back, the outer end of said slidably mounted means cooperating with the unattached edge of the back to yieldingly urge the same against the back of the frame whereby to normally close the space between the back and the frame.

In testimony that I claim the foregoing as my invention, I have signed my name hereto.

CHARLES L'ENFANT.